United States Patent
Hoareau et al.

(10) Patent No.: US 9,764,703 B2
(45) Date of Patent: Sep. 19, 2017

(54) POWER SOURCE ELEMENT DETECTION AND MONITORING

(71) Applicant: INTERNATIONAL BUSINESS MACHINES CORPORATION, Armonk, NY (US)

(72) Inventors: Guillaume Hoareau, Montpellier (FR); Johannes J. Liebenberg, Sandton (ZA); John G. Musial, Newburgh, NY (US); Todd R. Whitman, Bethany, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/004,327

(22) Filed: Jan. 22, 2016

(65) Prior Publication Data
US 2017/0210313 A1    Jul. 27, 2017

(51) Int. Cl.
B60R 16/04 (2006.01)
B60R 16/033 (2006.01)
B60L 11/00 (2006.01)

(52) U.S. Cl.
CPC .............. B60R 16/04 (2013.01); B60L 11/00 (2013.01); B60R 16/033 (2013.01); *B64C 2201/06* (2013.01); *B64C 2201/066* (2013.01)

(58) Field of Classification Search
CPC  B64C 2201/06; B64C 2201/066; B60L 11/00
(Continued)

(56) References Cited

U.S. PATENT DOCUMENTS

| 4,166,359 A | 9/1979 | Domokos |
| 5,763,116 A | 6/1998 | Lapinski et al. |

(Continued)

FOREIGN PATENT DOCUMENTS

| EP | 1094001 | 9/2001 |
| WO | 2009039454 | 3/2009 |
| WO | 2014175569 | 10/2014 |

OTHER PUBLICATIONS

Baguley, Richard; Best Drones 2015; Tom's Guide; Jun. 24, 2015; URL: http//www.tomesguide.com/us/best-drones,review-2412.html; Retrieved from the Internet Jul. 29, 2015; 13 pages.
(Continued)

*Primary Examiner* — Adi Amrany
(74) *Attorney, Agent, or Firm* — Schmeiser, Olsen & Watts; John R. Pivnichny

(57) ABSTRACT

An apparatus and method for replacing a power source element is provided. The apparatus includes a multiple compartment housing attached to a vehicle, power source elements, a controller, and a communications interface. The power source elements are placed within receptacles of the multiple compartment housing. Each power source element is electrically connected to an input power coupler for electrical connection to the vehicle such that each power source element is configured to supply power to the vehicle independently without requiring power supplied by any other power source element. The controller is configured to monitor a power level of each power source element and generate an associated power level reading. The communication interface is configured to retrieve each associated power level reading from the controller and to an external system.

17 Claims, 8 Drawing Sheets

(58) Field of Classification Search
USPC .................................................. 307/9.1, 10.1
See application file for complete search history.

(56) References Cited

U.S. PATENT DOCUMENTS

| | | | |
|---|---|---|---|
| 6,023,146 A | 2/2000 | Casale et al. | |
| 6,274,950 B1* | 8/2001 | Gottlieb | G01R 31/3648 307/66 |
| 6,803,678 B2* | 10/2004 | Gottlieb | G01R 31/3648 307/66 |
| 6,819,982 B2 | 11/2004 | Doane | |
| 7,379,305 B2* | 5/2008 | Briggs | G06F 1/181 361/727 |
| 8,056,860 B2 | 11/2011 | Small et al. | |
| 8,868,256 B2 | 10/2014 | Waid | |
| 8,899,903 B1 | 12/2014 | Saad et al. | |
| 9,045,218 B2 | 6/2015 | Childress et al. | |
| 9,056,676 B1* | 6/2015 | Wang | B64F 1/00 |
| 9,139,310 B1* | 9/2015 | Wang | B64F 1/36 |
| 9,387,928 B1* | 7/2016 | Gentry | B64C 39/024 |
| 9,434,267 B2* | 9/2016 | Wang | B60L 11/1822 |
| 2005/0077874 A1* | 4/2005 | Nakao | B60L 3/0046 320/116 |
| 2007/0148818 A1* | 6/2007 | Williams | H01L 23/49811 438/106 |
| 2008/0211309 A1* | 9/2008 | Nolte | H02J 7/0045 307/66 |
| 2008/0293277 A1* | 11/2008 | Kumar | H01R 13/53 439/247 |
| 2009/0082957 A1 | 3/2009 | Agassi et al. | |
| 2009/0276637 A1* | 11/2009 | Coonan | A61B 5/7475 713/300 |
| 2011/0027662 A1* | 2/2011 | Nishimura | H01M 10/0525 429/323 |
| 2011/0077809 A1 | 3/2011 | Leary | |
| 2011/0254503 A1 | 10/2011 | Widmer et al. | |
| 2012/0189453 A1* | 7/2012 | Curren | B64C 11/04 416/220 R |
| 2013/0221741 A1* | 8/2013 | Stanek | B60L 1/003 307/9.1 |
| 2014/0021923 A1* | 1/2014 | Uchida | H02J 7/0016 320/118 |
| 2014/0038007 A1* | 2/2014 | Ahn | H01M 10/5008 429/62 |
| 2014/0129059 A1 | 5/2014 | Scarlatti et al. | |
| 2014/0175873 A1* | 6/2014 | Kishimoto | H01M 10/441 307/10.1 |
| 2014/0178525 A1* | 6/2014 | Babin | B29C 45/322 425/564 |
| 2014/0252848 A1* | 9/2014 | Arumugam | B60L 1/006 307/9.1 |
| 2014/0303814 A1 | 10/2014 | Burema et al. | |
| 2014/0319272 A1 | 10/2014 | Casado Magaña et al. | |
| 2014/0339371 A1 | 11/2014 | Yates et al. | |
| 2014/0353429 A1 | 12/2014 | Lopez et al. | |
| 2015/0021985 A1* | 1/2015 | Matsuda | B60L 11/1877 307/10.1 |
| 2015/0030387 A1* | 1/2015 | Poustchi | E04B 1/38 403/361 |
| 2015/0042160 A1* | 2/2015 | Matsuda | B62K 11/04 307/10.3 |
| 2015/0063959 A1 | 3/2015 | Saad et al. | |
| 2015/0120094 A1 | 4/2015 | Kimchi et al. | |
| 2015/0249362 A1* | 9/2015 | Bridgelall | H02J 7/345 307/9.1 |
| 2015/0321755 A1* | 11/2015 | Martin | B64C 27/50 244/17.23 |
| 2016/0001883 A1* | 1/2016 | Sanz | B64F 1/02 244/17.23 |
| 2016/0031564 A1* | 2/2016 | Yates | B64D 33/00 307/9.1 |
| 2016/0039295 A1 | 2/2016 | Madurai-Kumar et al. | |
| 2016/0039300 A1* | 2/2016 | Wang | B60L 11/1822 244/39 |
| 2016/0039542 A1* | 2/2016 | Wang | B64D 39/00 701/2 |
| 2016/0056510 A1* | 2/2016 | Takeuchi | H01M 10/482 429/7 |
| 2016/0116914 A1 | 4/2016 | Mucci | |
| 2016/0144734 A1* | 5/2016 | Wang | B60L 11/1822 701/17 |
| 2016/0196756 A1* | 7/2016 | Prakash | B64C 39/024 701/3 |
| 2016/0307448 A1* | 10/2016 | Salnikov | A01B 79/02 |

OTHER PUBLICATIONS

Calculate Flight Time of LiPo Battery; URL: http://www.scoutuav.com/category/guide/power-system/calculate-flight-time/; Retrieved from the Internet Jul. 29, 2015; 1 page.

Cochran, Nigel; et al; Automated Refueling for Hovering Robots; URL: http://docslide.us/documents/1-8222011-automated-refueling-for-hovering-robots-nigel-cochran-janine-pizzimenti.html; Retrieved from the Internet Jul. 29, 2015; 1 page.

Dronehacks; 30 minutes flight time for the Ar.Drone with Zippy 2200mAh; Aug. 28, 2010; URL: http://dronehacks.com/2010/08/28/30-minutes-flight-time-for-the-ar-drone-with-zippy-ss00mAh/; Retrieved from the Internet Jul. 29, 2015; 1 page.

Farooqui, Adnan; Parrot AR.Drone 2.0 "Power Edition" Brings 36 Minutes of Flying Time; Ubergizmo.com; Aug. 18, 2013; URL: http://www.ubergizmo.com/2013/08/parott-ar-drone-2-0-power-edition-brings-36-minuted-of-flying-time.htm; Retrieved from the Internet Jul. 29, 2015; 4 pages.

Jager, Elliot; Domestic Drone Industry Can Boost Economy; Newsmax.com; URL: http://www.newsmax.com/Newsfront/drone-economy-domestic-boost/2013/12/03/id539607/; Retrieved from the Internet Jul. 29, 2015; 6 pages.

Kemper, Paulo F. et al.; UAV Consumable Replenishment: Design Concepts for Automated Service Stations; Journal of Intelligent and Robotic Systems; Mar. 2011; 27 pages.

Leavitt, Neal; iMedia Connection Blog; Aug. 20, 2014; URL: http://blogs.imediaconnection.com/blog/2014/08/30/up-up-and-away-commercial-drone/; Retrieved from the Internet Jul. 29, 2015; 10 pages.

Stone, Maddie; Amazon Can (Finally) Test Its Delivery Drones in the United States; Gizmodo.com; URL: //http://gizmodo.com/amazon-can-finally-test-its-delivery-drones-in-theun-1697124779; Retrieved from the Internet Jul. 29, 2015; 7 pages.

Suzuki, Koji A. O.; et al; Automatic Battery Replacement System for UAVs: Analysis and Design; J Intell Robot Syst; Sep. 9, 2011; 24 pages.

Teal Group Predicts Worldwide UAV Market Will Total $91 Billion in Its 2014 UAV Market Profile and Forecast; URL: http://www.tealgroup.com/index.php/about-teal-group-corporation/press-releases/118-2014-uav; Retrieved from the Internet Jul. 29, 2015; 4 pages.

The Drones Report: Market forecasts, regulatory barriers, top vendors, and leading commercial applications; Business Insider; URL: http://www.businessinsider.com/uav-or-commercial-drone-market-forcast-2015-2; Retrieved from the Internet Jul. 29, 2015; 3 pages.

Toksoz, Tuna et al; Automated Battery Management System for Enabling Multi-Agent Persistent Missions; Aerospace Controls Laboratory—Current and Recent Project Descriptions; URL: http://acl.mit.edu/projects/recharge.htm; Retrieved from the Internet Jul. 29, 2015; 7 pages.

Top 6 Best Drones for Sale: The Heavy Power List; Heavy.com; Oct. 20, 2014; URL: http://heavy.com/tech/2014/10/rc-best-drones-for-sale-aerial-photography-camera-surveillance; Retrieved from the Internet Jul. 29, 2015; 33 pages.

What is the Drone Industry Really Worth; Fortune.com; Mar. 12, 2013; URL: http://fortune.com/2013/03/12/what-is-the-drone-industry-really-worth; Retrieved from the Internet Jul. 29, 2015; 4 pages.

(56) References Cited

OTHER PUBLICATIONS

Wilbanks, Charles; Drones: A big industry waiting to be born; CBS News, Moneywatch; URL: http://222.cbsnews.com/news/drones-a-big-industry-waiting-to-be-nom/; Retrieved from the Internet Jul. 29, 2015; 7 pages.
Wilson, Daniel B., et al.; Guidance and Navigation for UAV Airborne Docking; Retrieved from the Internet Jul. 8, 2015; URL: http://www.roboticsproceedings.org; 9 pages.
Wilson, Daniel; Sky-high refueling for UAVs; Phys.Org; Apr. 23, 2015; http://phys.org/; 2 pages.
Office Action (Mail Date May 26, 2016) for U.S. Appl. No. 15/004,219, filed Jan. 22, 2016.
Amendment filed Aug. 22, 2016 in response to Office Action (Mail Date May 26, 2016) for U.S. Appl. No. 15/004,219, filed Jan. 22, 2016.
Final Office Action (Mail Date Nov. 25, 2016) for U.S. Appl. No. 15/004,219, filed Jan. 22, 2016.
Amendment filed Jan. 24, 2017 in response to Final Office Action (Mail Date Nov. 25, 2016) for U.S. Appl. No. 15/004,219, filed Jan. 22, 2016.

* cited by examiner

POWER SOURCE ELEMENT DETECTION AND MONITORING

FIELD

The present invention relates generally to an apparatus for replacing power source elements of a vehicle and in particular to an apparatus and associated method for replacing power source elements during operation of a vehicle.

BACKGROUND

Current vehicles requiring power are typically associated with a limited operational time frame. Limited operational time frames typically result in an interruption of current activities thereby preventing completion of operational tasks. Accordingly, there exists a need in the art to overcome at least some of the deficiencies and limitations described herein above.

SUMMARY

A first aspect of the invention provides a vehicle power source apparatus comprising: a multiple compartment housing comprising a plurality of receptacles configured to retain power source elements for supplying power to a vehicle, wherein said multiple compartment housing is configured to be physically attached to the vehicle; a plurality of power source elements within the plurality of receptacles, wherein each power source element of the plurality of power source elements is electrically connected to an input power coupler for electrical connection to the vehicle such that each power source element or grouping of power source elements of the plurality of power source elements is configured to supply power to the vehicle independently without requiring power supplied by any other power source element of the plurality of power source elements; a controller connected to the plurality of power source elements, wherein the controller is configured to monitor a power level of each power source element and generate a power level reading for each power level; and a communication interface communicatively coupled to the controller and an external system, wherein the communication interface is configured to retrieve each power level reading from the controller and transmit each power level reading to the external system.

A second aspect of the invention provides a vehicle power source replacement method comprising: supplying, by a plurality of power sources elements retained within a plurality of receptacles of a multiple compartment housing a vehicle power source apparatus, power to an vehicle, wherein the multiple compartment housing is physically attached to the vehicle, wherein each power source element of the plurality of power source elements is electrically connected to an input power coupler for electrical connection to the vehicle such that each power source element or grouping of power source elements of the plurality of power source elements is configured to supply power to the vehicle independently without requiring power supplied by any other power source element of the plurality of power sources; monitoring, by a controller connected to the plurality of power source elements, a power level of each power source element, wherein the controller is comprised by the vehicle power source apparatus; generating, by the controller, a power level reading for each power level; retrieving, by a communication interface communicatively coupled to the controller and comprised by the vehicle power source apparatus, each power level reading from the controller; and transmitting, by the communication interface, each power level reading to an external system.

A third aspect of the invention provides a computer program product, comprising a computer readable hardware storage device storing a computer readable program code, the computer readable program code comprising an algorithm that when executed by a controller of an vehicle power source apparatus implements a vehicle power source element replacement method, the method comprising: supplying, by a plurality of power source elements retained within a plurality of receptacles of a multiple compartment housing the vehicle power source apparatus, power to an vehicle, wherein the multiple compartment housing is physically attached to the vehicle, wherein each power source element of the plurality of power source elements is electrically connected to an input power coupler for electrical connection to the vehicle such that each power source element or grouping of power source elements of the plurality of power source elements is configured to supply power to the vehicle independently without requiring power supplied by any other power source element of the plurality of power source elements; monitoring, by the controller connected to the plurality of power source elements, a power level of each power source element, wherein the controller is comprised by the vehicle power source apparatus; generating, by the controller, a power level reading for each power level; retrieving, by a communication interface communicatively coupled to the controller and comprised by the vehicle power source apparatus, each power level reading from the controller; and transmitting, by the communication interface, each power level reading to an external system.

The present invention advantageously provides a simple method and associated system capable of supplying power to vehicles.

DETAILED DESCRIPTION

Figure 1:
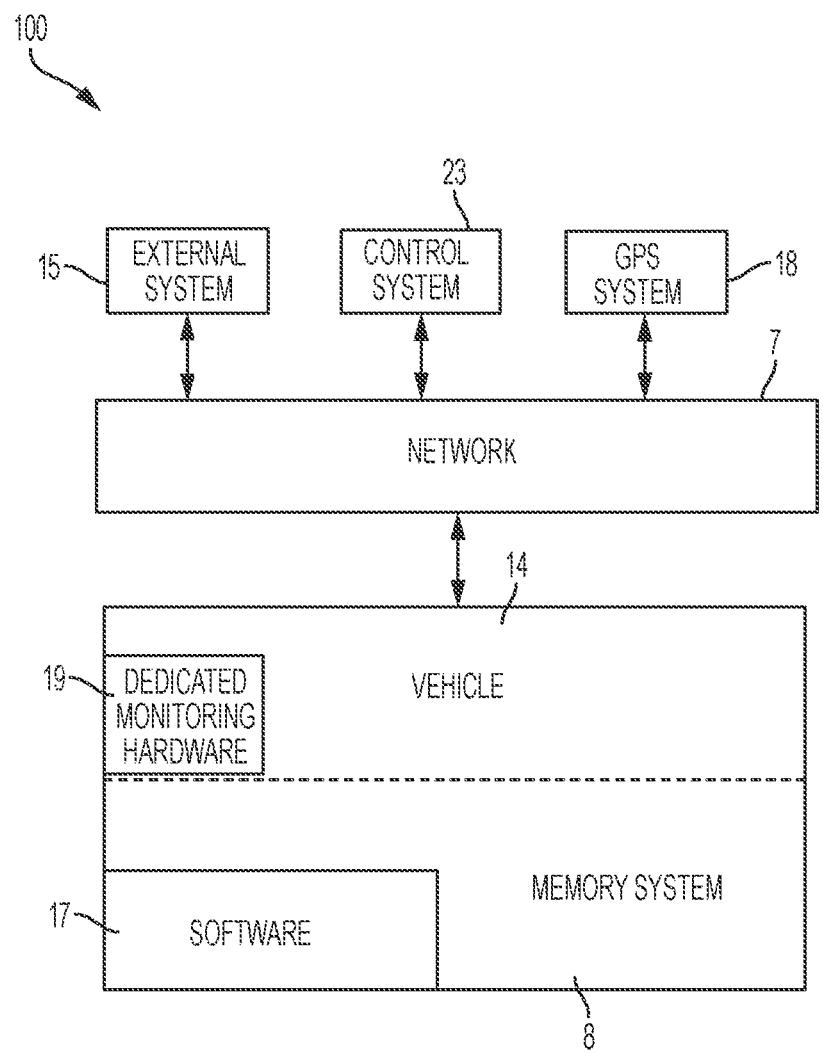
FIG. 1 illustrates a system for replacing power source elements in a vehicle during operation of the vehicle, in accordance with embodiments of the present invention.

FIG. 1 illustrates a system 100 for replacing power source elements in a vehicle 14 during operation of the vehicle, in accordance with embodiments of the present invention. System 100 enables a process for utilizing multiple power source elements for a vehicle 14 such that the vehicle includes a multiple compartment housing (e.g., at a center of gravity of the vehicle 14 retaining the multiple power source elements) such that the power source elements may be replaced and exchanged with fully charged power source elements during operation of the vehicle 14. Vehicle 14 may comprise any vehicle that does not require a human operator to be located within the vehicle such as, inter alia, a remote controlled vehicle (e.g., an aircraft flown by a pilot at a ground control station), an autonomously controlled vehicle (e.g., an aircraft controlled based on pre-programmed flight plans and may include an intelligence algorithm that would enable vehicle 14 to know it's location and self-determine a route to join with a second vehicle dynamically), a pre-programmed vehicle, etc. Alternatively, vehicle 14 may comprise any type of vehicle that includes a human operator located within the vehicle (e.g., an aircraft, an automobile, a boat or ship, a train, etc.). Vehicle 14 may include, inter alia, an aerial vehicle, a land based vehicle, a marine (water) based vehicle, etc. Power source elements may include any type of (portable) power source element including, inter alia, a battery, a fuel cell, etc.

Figure 2:
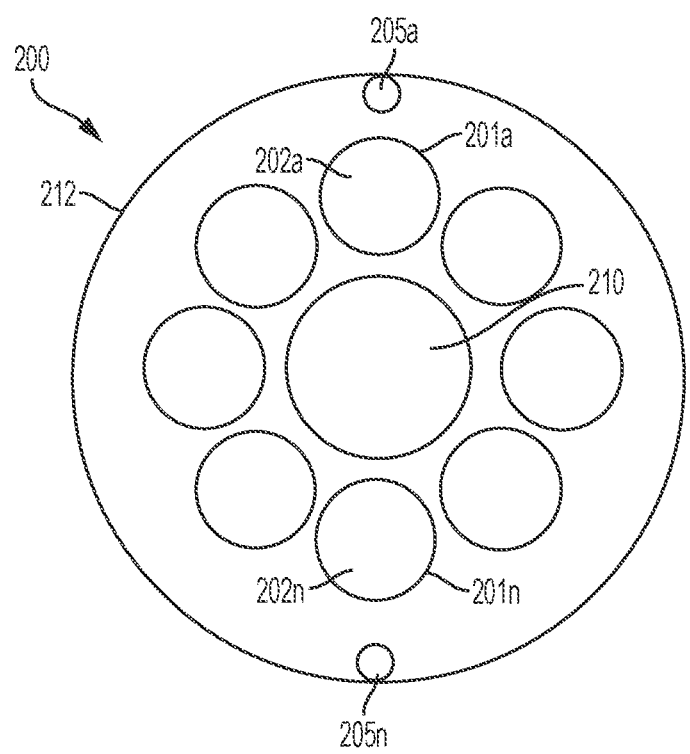
FIG. 2 illustrates a vehicle power source apparatus enabled by the system of FIG. 1 for replacing power source elements in a vehicle during operation of the vehicle, in accordance with embodiments of the present invention.
Figure 5:
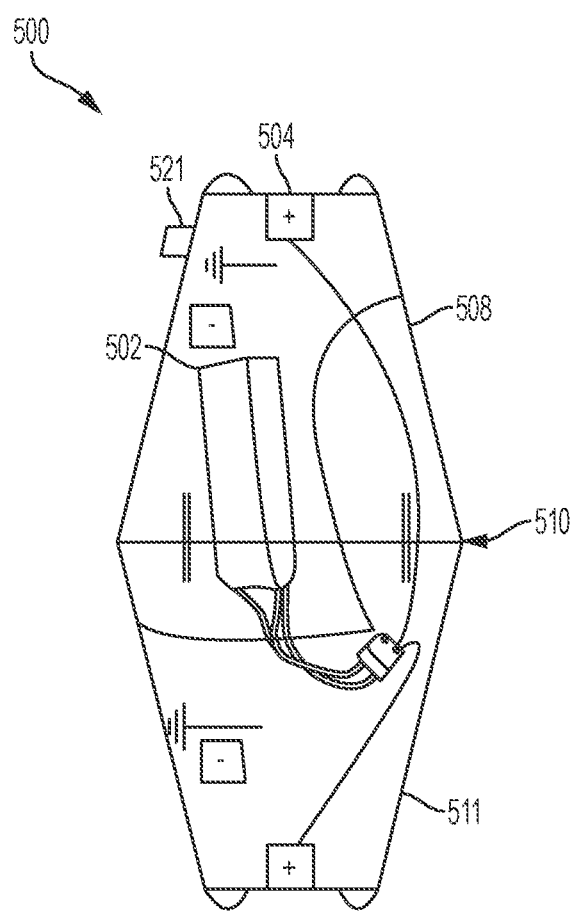
FIG. 5 illustrates a power source element residing within a power source capsule, in accordance with embodiments of the present invention.
Figure 6:
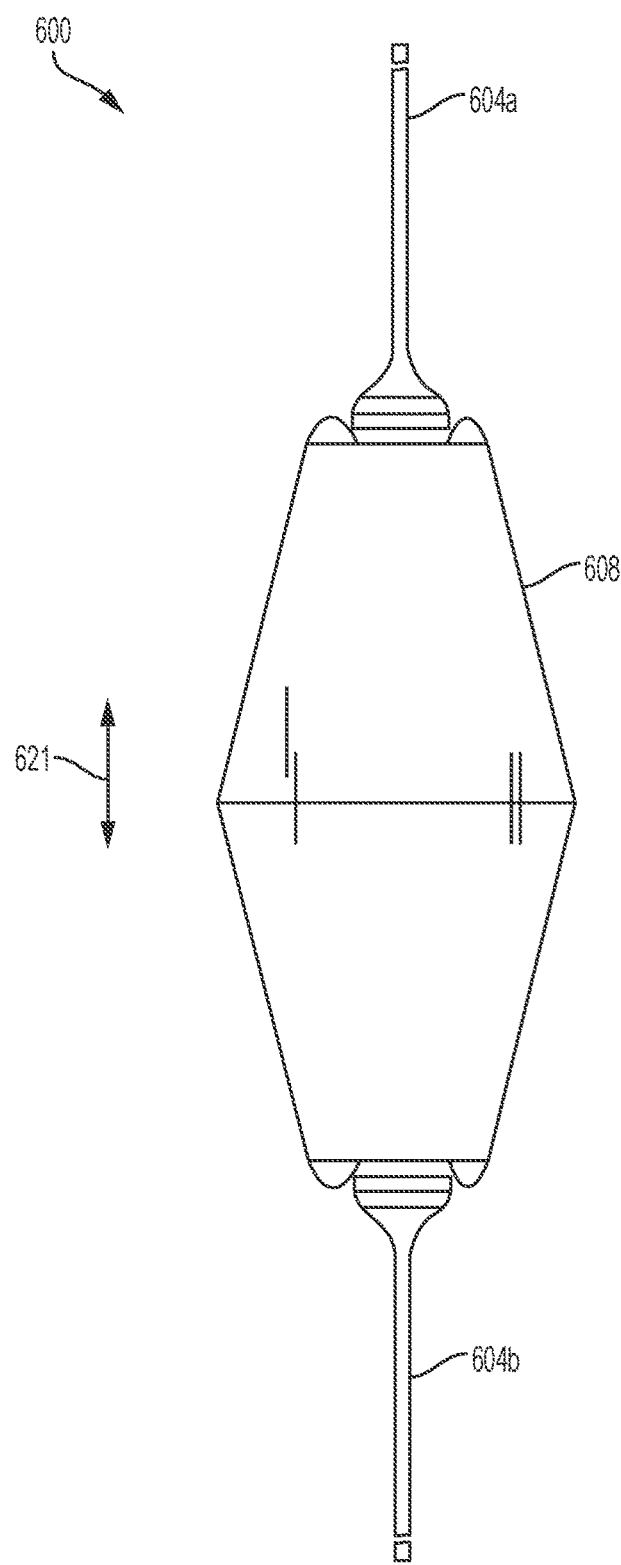
FIG. 6 illustrates a power source element/power source capsule, in accordance with embodiments of the present invention.
Figure 7:
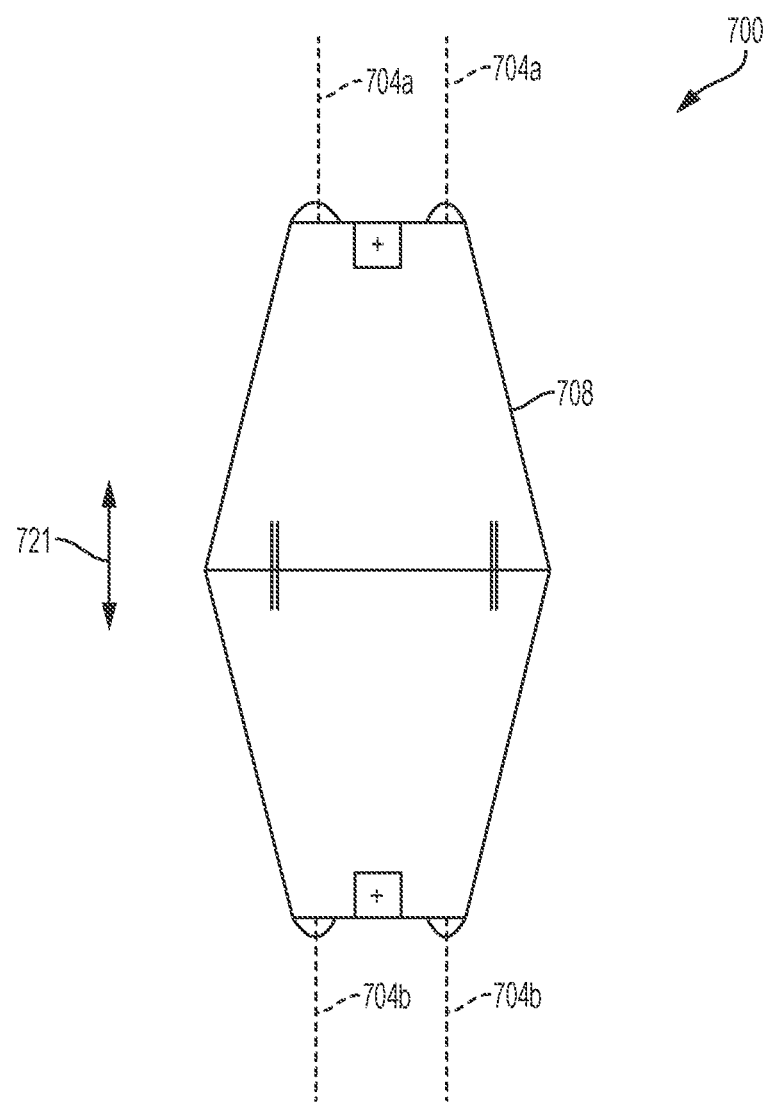
FIG. 7 illustrates a power source element/power source capsule, in accordance with embodiments of the present invention.

System 100 allows vehicle 14 to utilize a series of power source elements (e.g., power supplies) to power vehicle 14 for operation. System 100 enables vehicle 100 to draw power (e.g., a direct current voltage) from multiple power source elements that would extend an operational (e.g., flying) time, range, and delivery capacity for vehicle 14. Additionally, system 100 enables one or more power source elements (optionally comprising a specified shape) to be to be replaced during vehicle operation. For example, a power source element may be guided into an open chamber(s) or receptacle(s) in a multiple compartment power source housing as illustrated in FIG. 2, infra. A conical power source element shape (i.e., tapered on both ends as illustrated in FIG. 5-7) enable vehicle in-operation power source element exchange such that when inserting or extracting power source elements under in-operation conditions (e.g., vibrations, wind, inertia, etc.), an opening of a power source receptacle comprise a be greater size than an insertion end of an associated power source element to compensate for in-operation conditions. Additionally, a power source element (or associated housing) may comprise a guide hole design to allow docking and alignment via a tapered pin alignment method for compatible units. A power source element may comprise any shape such that a housing may encapsulate industry standard power source elements or any newly manufactured power source element designs.

System 100 of FIG. 1 includes an external system 15, a vehicle control system 23, and a GPS system 18 connected through a network to a vehicle 14. Vehicle 14 retrieves/generates GPS coordinates based data (from GPS system 18) in response to a determination that vehicle 14 requires replacement of at least one power source element. The GPS coordinates based data are analyzed (by external system 15) to determine exact coordinates for vehicle 14 requiring replacement of at least one power source element. Vehicle 14, external system 15, control system 23, and GPS system 18 each may comprise an embedded computer. An embedded computer is defined herein as a remotely portable dedicated computer comprising a combination of computer hardware and software (fixed in capability or programmable) specifically designed for executing a specialized function. Programmable embedded computers may comprise specialized programming interfaces. Additionally, vehicle 14, external system 15, control system 23, and GPS system 18 may each comprise a specialized hardware device comprising specialized (non-generic) hardware and circuitry (i.e., specialized discrete non-generic analog, digital, and logic based circuitry) for executing a process described with respect to FIG. 3. The specialized discrete non-generic analog, digital, and logic based circuitry may include proprietary specially designed components (e.g., a specialized integrated circuit designed for only implementing an automated process for enabling a process for replacing power source elements in a vehicle 14 during operation of the vehicle 14. Vehicle 14 includes a memory system 8, software 17, and dedicated monitoring hardware 19 (all sensors and associated monitoring hardware for enabling software 17 to execute a process for replacing power source elements in a vehicle during operation of the vehicle power such as, inter alia, power level detection circuitry, GPS sensors, temperature sensors, pressure sensors, etc.). The memory system 8 may include a single memory system. Alternatively, the memory system may include a plurality of memory systems. Network 7 may include any type of network including, inter alia, a local area network, (LAN), a wide area network (WAN), the Internet, a wireless network, etc.

The multiple compartment housing of system 100 may include a power supply strength indicator (presenting a charge level percentage) for each receptacle to determine an order in which power source elements should be changed (i.e., order of replacement). The multiple compartment housing may verify each time a power source element is installed by detecting a power level and maintaining a discharge history for each power source element (e.g., a burn rate) to determine the order of replacement. GPS positioning data may be used to determine current location coordinates.

FIG. 2 illustrates a vehicle power source apparatus 200 enabled by system 100 of FIG. 1 for replacing power source elements in a vehicle during operation of the vehicle, in accordance with embodiments of the present invention. Vehicle power source apparatus 200 comprises a multiple compartment housing 212 (configured to be physically attached to a vehicle), power source elements 202a . . . 202n, and control hardware 210. Multiple compartment housing 212 comprises receptacles 201a . . . 201n retaining power source elements 202a . . . 202n for supplying power to a vehicle (e.g., vehicle 14 of FIG. 1). The multiple compartment housing is configured to be physically attached to the vehicle. Multiple compartment housing 212 may be positioned above a center mass of a vehicle (e.g., an aircraft) such that it may be attached to a bottom portion of the vehicle thereby preventing interference with moving parts such as propellers. Multiple compartment housing 212 may be aligned with a multiple compartment housing of another vehicle (i.e., comprising replacement power source elements) via alignment holes 205a . . . 205n. A design of multiple compartment housing 212 enables a distribution of power source elements 202a . . . 202n to balance an associated weight such that not every receptacle requires a power source element. The power source elements 202a . . . 202n are retained within receptacles 201a . . . 201n and electrically connected to an input power coupler for electrical connection to the vehicle such that each power source element (or grouping of power source elements) is configured to supply power to the vehicle independently without requiring power supplied by any other power source element such that power source elements may be replaced during operation of the vehicle.

Control hardware 210 comprises specialized hardware configured to implement a process for replacing power source elements for a vehicle during operation of the vehicle. Control hardware 210 comprises a controller connected to power source elements 202a . . . 202n, a communication interface, a charge strength percentage indicator, and a global positioning satellite (GPS) receiver. The controller is configured to monitor a power level of each power source element and generate a power level reading for each power level. The power level readings may be used to determine an order for replacement of each power source element. The order for replacement may be determined based on generated replacement data specifying a replacement history of each power source element. Additionally, the order for replacement may be determined based on generated discharge data specifying a rate of power discharge for each power source element. The controller is further configured to determine a replacement requirement action for replacing each power source element based on a remaining power charge level percentage determined from charge level readings for each power source elements.

The communication interface is communicatively coupled to the controller and an external system (e.g., external system 15 of FIG. 1). The communication interface is configured to retrieve each power level reading from the controller and transmit each power level reading to the external system. Additionally, the communication interface is configured to transmit a message indicating a replacement requirement action to the external system.

The charge strength percentage indicators are connected to each power source element in each receptacle to present a current charge level percentage reading for power source element.

The GPS receiver is communicatively connected to the controller and is configured to receive geographical coordinates from a satellite to determine (based on retrieved geographical coordinates) a current location for vehicle power source apparatus 200. The GPS receiver is further enabled too receive additional geographical coordinates from the satellite to determine a current location for a power source element replacement location for replacing each power source element. The current location is determined based on a current location for vehicle power source apparatus 200 and a predicted range for vehicle power source apparatus 200 and the f power source elements with respect to the current location for the power source replacement element. The controller may additionally determine an estimated time of arrival for vehicle power source apparatus 200 arriving at a power source replacement location based on the predicted range.

Figure 3:
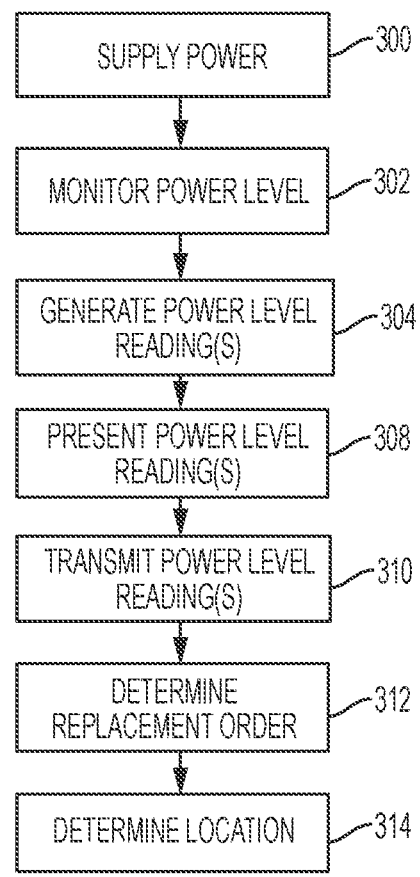
FIG. 3 illustrates a flowchart detailing a process enabled by the system of FIG. 1 for replacing power source elements in a vehicle during operation of the vehicle, in accordance with embodiments of the present invention.

FIG. 3 illustrates a flowchart detailing a process enabled by system 100 of FIG. 1 for replacing power source elements in a vehicle during operation of the vehicle, in accordance with embodiments of the present invention. Each of the steps in the algorithm of FIG. 3 may be enabled and executed in any order by a computer processor(s) executing computer code. In step 300, power sources elements (retained within a plurality of receptacles of a multiple compartment housing of a vehicle power source apparatus) supply power to a vehicle. The multiple compartment housing is physically attached to the vehicle. Each power source element is electrically connected to an input power coupler for electrical connection to the vehicle such that each said power source element or grouping of power source elements is configured to supply power to the vehicle independently without requiring power supplied by any other power source element. In step 302, a controller (i.e., comprised by the vehicle power source apparatus) connected to the plurality of power source elements monitors a power level of each power source element. In step 304, a power level reading for each power level is generated by the controller and retrieved by a communication interface communicatively coupled to the controller. In step 308, a current charge level percentage reading for each said power source element may be presented via a charge strength percentage indicator. In step 310, each power level reading is transmitted to an external system for processing. In step 312, the controller determines (based on: each power level, a replacement history of each power source element, and/or discharge data specifying a rate of power discharge for each power source element) an order for replacement of each power source element. In step 314, a GPS receiver (of the multiple compartment housing) receives geographical coordinates from a satellite and determines (based on the geographical coordinates) a current location for the vehicle power source apparatus.

Figure 4:
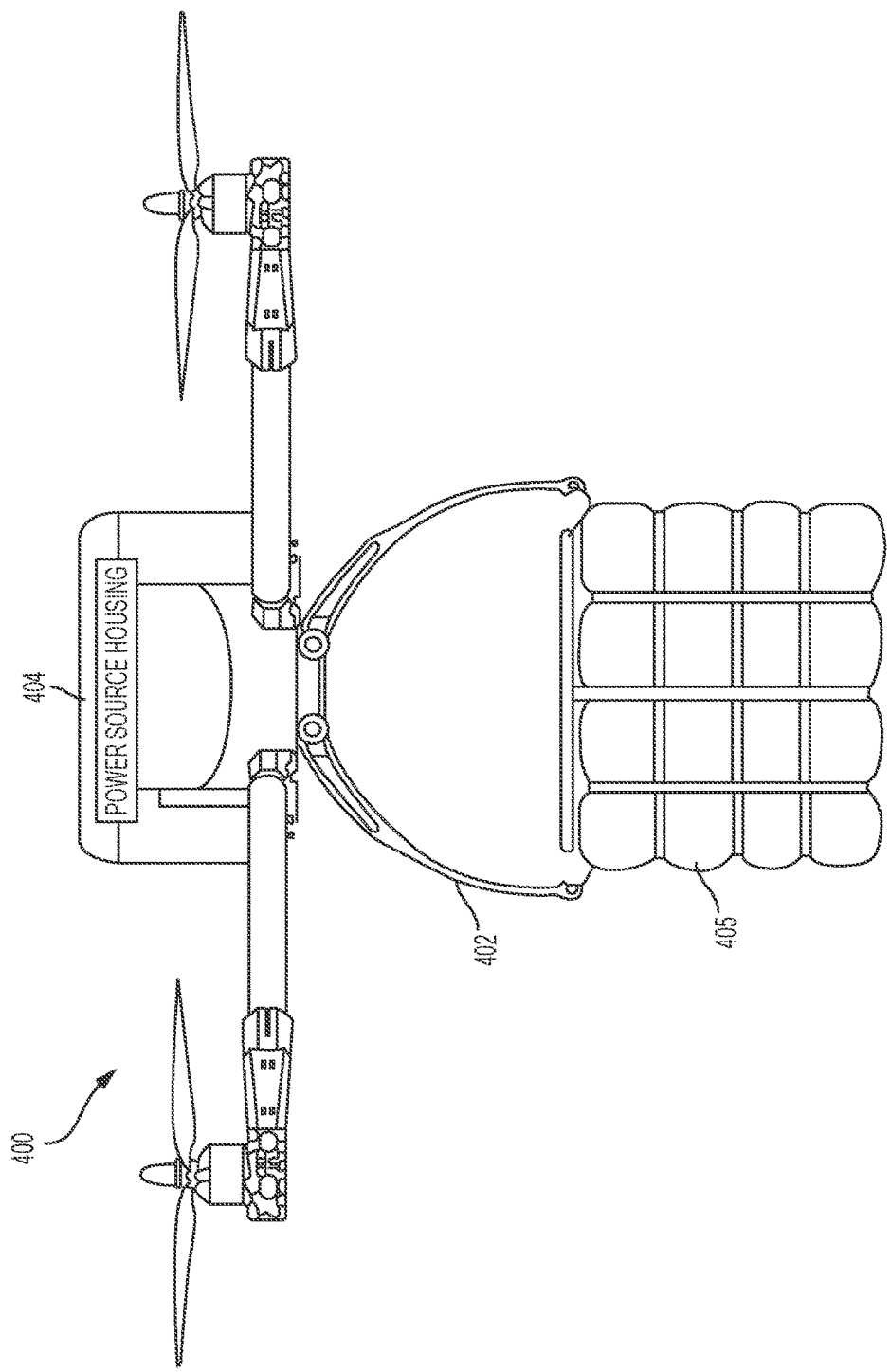
FIG. 4 illustrates a vehicle comprising an attached vehicle power source apparatus enabled by the system of FIG. 1 for replacing power source elements in a vehicle during operation of vehicle, in accordance with embodiments of the present invention.

FIG. 4 illustrates a vehicle 400 comprising an attached vehicle power source apparatus 404 enabled by system 100 of FIG. 1 for replacing power source elements in a vehicle during operation of vehicle 400, in accordance with embodiments of the present invention. Vehicle 400 comprises a retaining mechanism 402 for retaining a package 405 for delivery.

FIG. 5 illustrates a power source element 502 residing within a power source capsule 500, in accordance with embodiments of the present invention. Power source capsule 500 is configured to be placed within a receptacle of a multiple compartment housing (e.g., receptacle 201a of multiple compartment housing 212 of FIG. 2). Power source capsule 500 may comprise a visual indicator 521 (e.g., a lamp, an LED, etc.) indicting that power source element 502 is discharged and requires replacement. Power source capsule 500 may comprise a first portion 508 electro-magnetically or mechanically connected (at seam 510) to a second portion 511 such that first portion 508 may be raised from second portion 511 to allow for access to/replacement of power source element 502. A canonical (or any specialized) shape (i.e., as illustrated in FIG. 5) of power source capsule 500 (or a power source element itself) may facilitate replacement during operation of a vehicle (e.g., in flight). The specialized shape enables easy replacement of power source capsule 500 by eliminating issues associated with wind, vibrations, etc. Power source capsule 500 may be locked into place within a receptacle and a seal (e.g., an O-ring) may be used to create a weather-proof seal when power source capsule 500 is locked into place.

FIG. 6 illustrates a power source element/power source capsule 600, in accordance with embodiments of the present invention. Power source element/power source capsule 600 comprises mechanical actuators 604a and 604b for retrieving or removing power source element/power source capsule 600 from an associated receptacle for replacement. Mechanical actuators 604a and 604b may comprise, inter alia, a piston mechanism for automatically moving power source element/power source capsule 600 in directions 621 for replacement.

FIG. 7 illustrates a power source element/power source capsule 700, in accordance with embodiments of the present invention. Power source element/power source capsule 700 comprises mechanical actuators 704a and 704b for retrieving or removing power source element/power source capsule 700 from an associated receptacle for replacement. Mechanical actuators 704a and 704b may comprise, inter alia, mechanical resilient structures/devices such as chains, elongated members, etc. for automatically moving power source element/power source capsule 700 in directions 721 for replacement.

Figure 8:
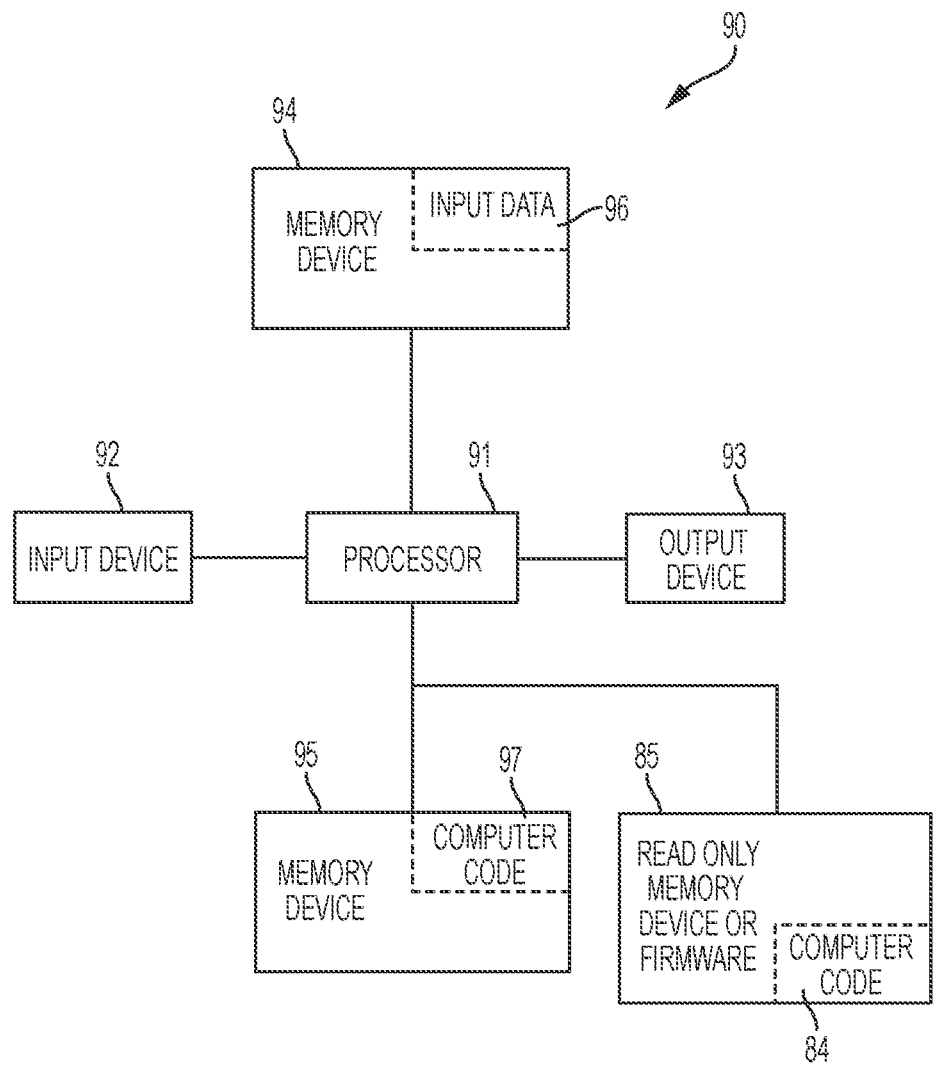
FIG. 8 illustrates a computer system used by the system of FIG. 1 for enabling a process for replacing power source elements in a vehicle during operation of the vehicle, in accordance with embodiments of the present invention.

FIG. 8 illustrates a computer system 90 (e.g., external system 15, vehicle control system 23, GPS system 18, and vehicle 14a of FIG. 1) used by or comprised by the system of FIG. 1 for enabling a process for replacing power source elements in a vehicle during operation of the vehicle, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 8 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 3) for enabling a process for replacing power source elements in a vehicle during operation of the vehicle. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include the algorithm of FIG. 3 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including the algorithm of FIG. 3) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to replace power source elements in a vehicle during operation of the vehicle. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for replacing power source elements in a vehicle during operation of the vehicle. In another embodiment, the invention provides a business method that performs the process steps of the invention on a subscription, advertising, and/or fee basis. That is, a service supplier, such as a Solution Integrator, could offer to enable a process for replacing power source elements in a vehicle during operation of the vehicle. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 8 shows the computer system 90 as a particular configuration of specialized hardware and software, any configuration of hardware and software, as would be known to a person of ordinary skill in the art, may be utilized for the purposes stated supra in conjunction with the particular computer system 90 of FIG. 8. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A vehicle power source apparatus comprising:
a multiple compartment housing comprising a plurality of receptacles configured to retain power source elements for supplying power to a vehicle, wherein said multiple compartment housing is configured to be physically attached to said vehicle, wherein said multiple compartment housing comprises alignment guide holes for aligning, via a tapered pin alignment method, said multiple compartment housing with an additional multiple compartment housing, comprising tapered pins, of an additional vehicle via a docking process occurring during operation of said vehicle and said additional vehicle;
a plurality of power source elements residing within a plurality of power source capsules, wherein said plurality of power source elements residing within said plurality of power source capsules are placed within said plurality of receptacles, wherein each power source capsule of said plurality of power source capsule comprises an O-ring seal for creating a weather proof seal when each said power source capsule is locked into place within said plurality of receptacles, wherein each power source element of said plurality of power source elements is independently electrically connected, through a power source capsule of said plurality of power source capsules, to an input power coupler for independent electrical connection to said vehicle such that each said power source element or grouping of power source elements of said plurality of power source elements is configured to supply power to said vehicle independently without requiring power supplied by any other power source element of said plurality of power source elements, wherein each said power source capsule comprises a conical shape for placement within an associated receptacle of said plurality of receptacles, wherein each said power source capsule comprises a first conical portion electro-magnetically connected to a second conical portion, wherein said first conical portion comprises a first mechanical actuator, wherein said second conical portion comprises a second mechanical actuator, and wherein each said first mechanical actuator and each said second mechanical actuator comprises a piston mechanism configured to automatically move each said power source capsule in multiple directions for removing each said power source capsule from an associated receptacle of said plurality of receptacles for replacement;

a controller connected to said plurality of power source elements, wherein said controller is configured to monitor a power level of each said power source element and generate a power level reading for each said power level, and wherein said controller is further configured to determine, based on each said power level, an order for replacement of each said power source element; and a communication interface communicatively coupled to said controller and an external system, wherein said communication interface is configured to retrieve each said power level reading and said order for replacement from said controller and transmit each said power level reading and said order for replacement to said external system, and wherein at least one power source element of said plurality of power source elements is replaced based on each said power level reading and said order for replacement with a fully charged power source element supplied by said additional multiple compartment housing during said docking process occurring during said operation of said vehicle and said additional vehicle.

2. The vehicle power source apparatus of claim 1, wherein said multiple compartment housing further comprises a charge strength percentage indicator connected to each said power source element in each said receptacle, and wherein each said charge strength percentage indicator is configured to present a current charge level percentage reading for each said power source element.

3. The vehicle power source apparatus of claim 1, wherein said controller is further configured to generate replacement data specifying a replacement history of each said power source element, and wherein said order for replacement of each said power source element is further based on said replacement data.

4. The vehicle power source apparatus of claim 1, wherein said controller is further configured generate discharge data specifying a rate of power discharge for each said power source element, and wherein said order for replacement of each said power source element is further based on said discharge data.

5. The vehicle power source apparatus of claim 1, further comprising:

a global positioning satellite (GPS) receiver communicatively connected to said controller, wherein said GPS receiver is configured to receive geographical coordinates from a satellite, and wherein said controller is further configured to determine, based on said geographical coordinates, a current location for said vehicle power source apparatus.

6. The vehicle power source apparatus of claim 5, wherein said controller is further configured to determine a replacement requirement action for replacing each said power source element based on a remaining power charge level percentage determined from said charge level reading, and wherein said communication interface is further configured to transmit a message, to said external system, indicating said replacement requirement action.

7. The vehicle power source apparatus of claim 6, wherein said controller is further configured to determine a current location for a power source element replacement location for replacing each said power source.

8. The vehicle power source apparatus of claim 7, wherein said current location for said power source replacement location is determined based on said current location for said vehicle power source apparatus and a predicted range for said vehicle power source apparatus and said plurality of power sources with respect to said current location for said power source replacement location.

9. The vehicle power source apparatus of claim 8, wherein said controller is further configured to determine an estimated time of arrival for said vehicle power source apparatus arriving at said power source replacement element based on said predicted range.

10. The vehicle power source apparatus of claim 1, wherein each said power source element comprises a battery or a fuel cell.

11. The vehicle power source apparatus of claim 1, wherein said vehicle is selected from the group consisting of an air based vehicle, a land based vehicle, and marine based vehicle.

12. The vehicle power source apparatus of claim 1, wherein said vehicle does not require a human operator to be located within said vehicle.

13. A vehicle power source replacement method comprising:

supplying, by a plurality of power sources elements residing within a plurality of power source capsules retained within a plurality of receptacles of a multiple compartment housing of a vehicle power source apparatus, power to a vehicle, wherein each power source capsule of said plurality of power source capsule comprises an O-ring seal for creating a weather proof seal when each said power source capsule is locked into place within said plurality of receptacles, wherein said multiple compartment housing is configured to be physically attached to said vehicle, wherein said multiple compartment housing comprises alignment guide holes for aligning, via a tapered pin alignment method, said multiple compartment housing with an additional multiple compartment housing, comprising tapered pins, of an additional vehicle via a docking process occurring during operation of said vehicle and said additional vehicle, wherein each power source element of said plurality of power source elements is independently electrically connected, through a power source capsule of said plurality of power source capsules, to an input power coupler for independent electrical connection to said vehicle such that each said power source element or grouping of power source elements of said plurality of power source elements is configured to supply power to said vehicle independently without requiring power supplied by any other power source element of said plurality of power sources, wherein each said power source capsule comprises a conical shape for placement within an associated receptacle of said plurality of receptacles, wherein each said power source capsule comprises a first conical portion electromagnetically connected to a second conical portion, wherein said first conical portion comprises a first mechanical actuator, wherein said second conical portion comprises a second mechanical actuator, and wherein each said first mechanical actuator and each said second mechanical actuator comprises a piston mechanism configured to automatically move each said power source capsule in multiple directions for removing each said power source capsule from an associated receptacle of said plurality of receptacles for replacement;

monitoring, by a controller connected to said plurality of power source elements, a power level of each said power source element, wherein said controller is comprised by said vehicle power source apparatus;

generating, by said controller, a power level reading for each said power level;

determining, by said controller based on each said power level, an order for replacement of each said power source element;

retrieving, by a communication interface communicatively coupled to said controller and comprised by said vehicle power source apparatus, each said power level reading and said order for replacement from said controller; and transmitting, by said communication interface, each said power level reading and said order for replacement to an external system, wherein at least one power source element of said plurality of power source elements is replaced, based on each said power level reading and said order for replacement, with a fully charged power source element within an associated power source capsule of said plurality of power source capsules, supplied by said additional multiple compartment housing during said docking process occurring during said operation of said vehicle and said additional vehicle.

14. The method of claim 13, wherein said multiple compartment housing further comprises a charge strength percentage indicator connected to each said power source element in each said receptacle, and wherein said method further comprises:

presenting, by each said charge strength percentage indicator a current charge level percentage reading for each said power source element.

15. The method of claim 13, further comprising:

generating, by said controller, replacement data specifying a replacement history of each said power source element, wherein said order for replacement of each said power source element is further based on said replacement data.

16. The method of claim 13, further comprising:

generating, by said controller, discharge data specifying a rate of power discharge for each said power source element, and wherein said order for replacement of each said power source element is further based on said discharge data.

17. A computer program product, comprising a computer readable hardware storage device storing a computer readable program code, said computer readable program code comprising an algorithm that when executed by a controller of an vehicle power source apparatus implements an vehicle power source element replacement method, said method comprising:

supplying, by a plurality of power sources elements residing within a plurality of power source capsules retained within a plurality of receptacles of a multiple compartment housing of a vehicle power source apparatus, power to a vehicle, wherein each power source capsule of said plurality of power source capsule comprises an O-ring seal for creating a weather proof seal when each said power source capsule is locked into place within said plurality of receptacles, wherein said multiple compartment housing is configured to be physically attached to said vehicle, wherein said multiple compartment housing comprises alignment guide holes for aligning, via a tapered pin alignment method, said multiple compartment housing with an additional multiple compartment housing, comprising tapered pins, of an additional vehicle via a docking process occurring during operation of said vehicle and said additional vehicle, wherein each power source element of said plurality of power source elements is independently electrically connected, through a power source capsule of said plurality of power source capsules, to an input power coupler for independent electrical connection to said vehicle such that each said power source element or grouping of power source elements of said plurality of power source elements is configured to supply power to said vehicle independently without requiring power supplied by any other power source element of said plurality of power sources, wherein each said power source capsule comprises a conical shape for placement within an associated receptacle of said plurality of receptacles, wherein each said power source capsule comprises a first conical portion electromagnetically connected to a second conical portion, wherein said first conical portion comprises a first mechanical actuator, wherein said second conical portion comprises a second mechanical actuator, and wherein each said first mechanical actuator and each said second mechanical actuator comprises a piston mechanism configured to automatically move each said power source capsule in multiple directions for removing each said power source capsule from an associated receptacle of said plurality of receptacles for replacement;

monitoring, by a controller connected to said plurality of power source elements, a power level of each said power source element, wherein said controller is comprised by said vehicle power source apparatus;

generating, by said controller, a power level reading for each said power level;

determining, by said controller based on each said power level, an order for replacement of each said power source element;

retrieving, by a communication interface communicatively coupled to said controller and comprised by said vehicle power source apparatus, each said power level reading and said order for replacement from said controller; and transmitting, by said communication interface, each said power level reading and said order for replacement to an external system, wherein at least one power source element of said plurality of power source elements is replaced, based on each said power level reading and said order for replacement, with a fully charged power source element within an associated power source capsule of said plurality of power source capsules, supplied by said additional multiple compartment housing during said docking process occurring during said operation of said vehicle and said additional vehicle.

* * * * *